United States Patent
Qu et al.

(10) Patent No.: US 10,917,455 B2
(45) Date of Patent: Feb. 9, 2021

(54) FILE TRANSFER DISPLAY CONTROL METHOD AND APPARATUS, AND CORRESPONDING TERMINAL

(71) Applicant: Beijing Dajia Internet Information Technology Co., Ltd., Beijing (CN)

(72) Inventors: Meikai Qu, Beijing (CN); Hui Xue, Beijing (CN); Jian Wu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/635,337

(22) PCT Filed: Aug. 2, 2018

(86) PCT No.: PCT/CN2018/098368
§ 371 (c)(1),
(2) Date: Jan. 30, 2020

(87) PCT Pub. No.: WO2019/024898
PCT Pub. Date: Feb. 7, 2019

(65) Prior Publication Data
US 2020/0169596 A1 May 28, 2020

(30) Foreign Application Priority Data
Aug. 3, 2017 (CN) .......................... 2017 1 0656020

(51) Int. Cl.
*H04L 29/08* (2006.01)
*G06F 3/0481* (2013.01)
(Continued)

(52) U.S. Cl.
CPC ............ *H04L 67/06* (2013.01); *G06F 3/0481* (2013.01); *G06F 3/0484* (2013.01); *G06F 9/451* (2018.02); *G06F 16/168* (2019.01); *H04L 67/02* (2013.01)

(58) Field of Classification Search
CPC ............... H04N 21/47; H04N 21/4316; H04N 21/4438; H04N 5/44591; H04N 21/2187;
(Continued)

(56) References Cited

U.S. PATENT DOCUMENTS 7,039,872 B1 * 5/2006 Raheman ............... G06F 3/0481
705/14.46
2001/0043366 A1 * 11/2001 Kameyama ........ H04N 1/00204
358/403
(Continued)

FOREIGN PATENT DOCUMENTS

CN 101588408 A 11/2009
CN 101888440 A 11/2010
(Continued)

OTHER PUBLICATIONS

International Search Report and Written Opinion issued by the International Searching Authority (ISA/US) in PCT Application No. PCT/CN2018/098368 dated Oct. 25, 2018. 9 pages including the English translation of the International Search Report.

*Primary Examiner* — Abdullahi E Salad
(74) *Attorney, Agent, or Firm* — Meunier Carlin & Curfman LLC (57) ABSTRACT

The present application relates to the field of software application, and specifically relates to a file transfer display control method and apparatus, and a corresponding terminal. The method comprises the steps of: an application executes a file transfer task; obtain transfer progress information of the file transfer task; and overlay a floating window assembly at the top layer of a preset display interface of the application, and display the transfer progress information in the floating window assembly. According to the present application, by overlaying the floating window assembly at the top layer of the preset display interface of the application and displaying the transfer progress information in the
(Continued)

floating window assembly, preposition of the transfer progress information of the file transfer task is achieved, so that a user can conveniently check the file transfer progress in the preset display interface of application in real time. In addition, the floating window assembly is overlaid at the top layer of the preset display interface in an independent manner without affecting the user's operation on the preset display interface currently being browsed, frequent switching of application pages is reduced, consumption of terminal resources is reduced, and user time is saved.

15 Claims, 5 Drawing Sheets

(51) Int. Cl.
*G06F 16/16* (2019.01)
*G06F 3/0484* (2013.01)
*G06F 9/451* (2018.01)

(58) Field of Classification Search
CPC .... G06F 3/04845; G06F 3/0481; G06F 9/451; G06F 16/168; G06F 3/0484; G06F 2203/04804; G11B 27/34; H04L 67/02; H04L 67/06; H04L 67/36
See application file for complete search history.

(56) References Cited

U.S. PATENT DOCUMENTS

| 2002/0032489 | A1* | 3/2002 | Tynan | G06F 16/137 |
| | | | | 700/1 |
| 2009/0089393 | A1* | 4/2009 | Yi | H04L 67/28 |
| | | | | 709/211 |
| 2013/0239040 | A1* | 9/2013 | Kaleta | G06F 3/0484 |
| | | | | 715/772 |
| 2017/0344192 | A1* | 11/2017 | Liu | H04N 21/47 |

FOREIGN PATENT DOCUMENTS

| CN | 102104865 A | 6/2011 |
| CN | 102368194 A | 3/2012 |
| CN | 103731186 A | 4/2014 |
| CN | 105095050 A | 11/2015 |
| CN | 105808230 A | 7/2016 |
| CN | 106569678 A | 4/2017 |
| CN | 106775372 A | 5/2017 |
| CN | 106980441 A | 7/2017 |
| CN | 107291356 A | 10/2017 |

* cited by examiner

FILE TRANSFER DISPLAY CONTROL METHOD AND APPARATUS, AND CORRESPONDING TERMINAL

CROSS-REFERENCE

The present application is a US National Stage of International Application No. PCT/CN2018/098368, filed on Aug. 2, 2018, which claims priority to China Patent Application No. 201710656020.8, filed on Aug. 3, 2017 and entitled "File Transfer Display Control Method and Apparatus, and Corresponding Terminal", which is hereby incorporated by reference in its entirety.

FIELD

The present disclosure relates to the field of software application, and particularly to a file transfer display control method and apparatus, and a corresponding terminal.

BACKGROUND

With the rapid development of Internet technologies, more and more people use a platform provided by the Internet to share their works with others. Especially as the concept of User Generated Content (UGC) constantly deepens, people are happy to upload local works to a content aggregation platform to share them with others or transfer the local works to other terminals for storage. These actions all involve file transfer between one terminal and another terminal or between a terminal and a server. A current display mode during the file transfer has an obvious deficiency. At present, the transfer progress during the file transfer is displayed on a separate page. When a user leaves this page for other operations, progress information of the file transfer cannot be checked in real time, and the user cannot know in time when the file transfer fails. When the file transfer fails, the user needs to switch to this separate page to resume the file transfer. For example, the user browses a video on page 1, and page 2 shows the progress of the file transfer. During the file transfer, the user needs to switch back and forth to page 2 to check the progress of the file transfer. Furthermore, if the file transfer fails, the user needs to stop watching the video on page 1 and switch to page 2 to re-execute a file transfer task. The frequent page switching increases the consumption of terminal resources, wastes user's time, and brings various inconveniences to the user.

SUMMARY

The present disclosure is directed to provide a file transfer display control method and apparatus, and a corresponding terminal, which solve the problem that a user cannot check the progress of file transfer in real time during file transfer executed by an application, so as to reduce frequent switching of application pages, reduce the consumption of terminal resources, save user's time and improve the user experience.

In order to achieve the objective, the present disclosure uses the following technical solution.

According to a first aspect, the present disclosure provides a file transfer display control method, including the following steps:

executing, by the application, a file transfer task;

acquiring transfer progress information of the file transfer task; and superposing a floating window component on top of a preset display interface of the application, and displaying the transfer progress information in the floating window component.

According to a second aspect, the present disclosure provides a file transfer display control apparatus, including:

a transfer module, configured to execute a file transfer task;

an acquiring module, configured to acquire transfer progress information of the file transfer task; and a display module, configured to superpose a floating window component on top of the preset display interface of the application, and display the transfer progress information in the floating window component.

According to a third aspect, the present disclosure provides a terminal, comprising:

one or more processors;

a memory; and one or more application programs, where the one or more application programs are stored in the memory and configured to be executed by the one or more processors. The one or more application programs are configured to execute the steps of any file transfer display method in the first aspect.

According to a fourth aspect, the present disclosure provides a computer readable storage medium storing a computer program;

the computer program is executed by the processor to implement any file transfer display control method in the first aspect.

Compared with the prior art, the present disclosure has the following advantages.

When the application executes the file transfer task, the present disclosure realizes displaying of the transfer progress information of the file transfer task executed by the application on top by acquiring the transfer progress information of the file transfer task, superposing the floating window component on top of the preset display interface of the application and displaying the transfer progress information in the floating window component so that the user can conveniently check the file transfer progress in real time through the preset display interface, and meanwhile, the floating window component is superposed on top of the preset display interface in an independent existence manner, so as to not affect the user to operate the current browsed preset display interface, reduce frequent switching of application pages, reduce the consumption of terminal resources, save user's time and improve the user experience.

In addition, in the present disclosure, according to different feature information of the preset display interfaces, position information and/or the display form of the floating window component adaptively change/changes with the change of the preset display interfaces when a different preset display interface is switched to, so that flexible arrangement of the position information and the display form of the floating window component in different preset display interfaces avoids that a fixed floating window component affects the user to browse the current preset display interface due to the feature information of the different preset display interfaces.

Furthermore, the user can directly give pause, cancel and retransfer instructions for the file transfer tasks in the floating window component, so as to facilitate the operations for the file transfer tasks. Moreover, the number of times of switching the application pages by the user is reduced, the consumption of the terminal resources is reduced, the user's time is saved, and the user experience is further enhanced.

Obviously, the above description of the advantages of the present disclosure is recapitulatory, and more advantage descriptions will be embodied in the subsequent embodiments. Those skilled in the art can also reasonably discover many other advantages of the present disclosure based on the content disclosed in the present disclosure.

Additional aspects and advantages of the present disclosure will be partially provided in the following descriptions, and will become apparent from the following descriptions or be learned through the practice of the present disclosure.

BRIEF DESCRIPTION OF THE DRAWINGS

The above and/or additional aspects and advantages of the present application will become apparent and easily understandable from the following descriptions of the embodiments with reference to the accompanying drawings, where.

DETAILED DESCRIPTION OF THE EMBODIMENTS

The embodiments of the present disclosure are described in detail below. Examples of the embodiments are shown in the accompanying drawings. The same or similar reference numerals represent the same or similar elements or elements having the same or similar functions throughout. The embodiments described below with reference to the accompanying drawings are exemplary and are only used to explain the present disclosure, and cannot be construed as limiting the present disclosure.

Those skilled in the art can understand that, unless specifically stated, the singular forms "a", "an", "said" and "the" used herein may include plural forms. It should be further understood that the wording "include" used in the specification of the present disclosure refers to the presence of the features, integers, steps and operations, but does not exclude the presence or addition of one or more other features, integers, steps and operations.

Those skilled in the art can understand that, unless otherwise defined, all terms (including technical terms and scientific terms) used herein have the same meaning as commonly understood by those of ordinary skilled in the art to which the present disclosure belongs. It should also be understood that terms such as those defined in the general dictionary should be understood to have meanings consistent with the meanings in the context of the prior art, and unless specifically defined like this, they would not be explained by idealized or too formal meanings.

Those skilled in the art should understand that the concepts of "application", "application program", "application software" and similar expressions in the present disclosure are the same concepts known to those skilled in the art, and refer to computer software organically constructed by a series of computer instructions and related data resources and suitable for electronic operation. Unless especially specified, this naming is neither limited by the type or levels of programming languages, nor limited by operating systems or platforms on which it is running. Naturally, such concepts are not limited by terminals in any form.

Those skilled in the art should understand that a user interface or display interface referred to in the present disclosure generally refers to a display interface that can be configured to send a control instruction to an intelligent terminal. For example, it can be an option (or a key, added by the application program, similarly hereinafter) in a setting page of an Android/OS/Windows Phone system, or an option in a notification bar or an interactive page that is called from the desktop, or an option in a page constructed by an activity component of the application program.

Figure 1:
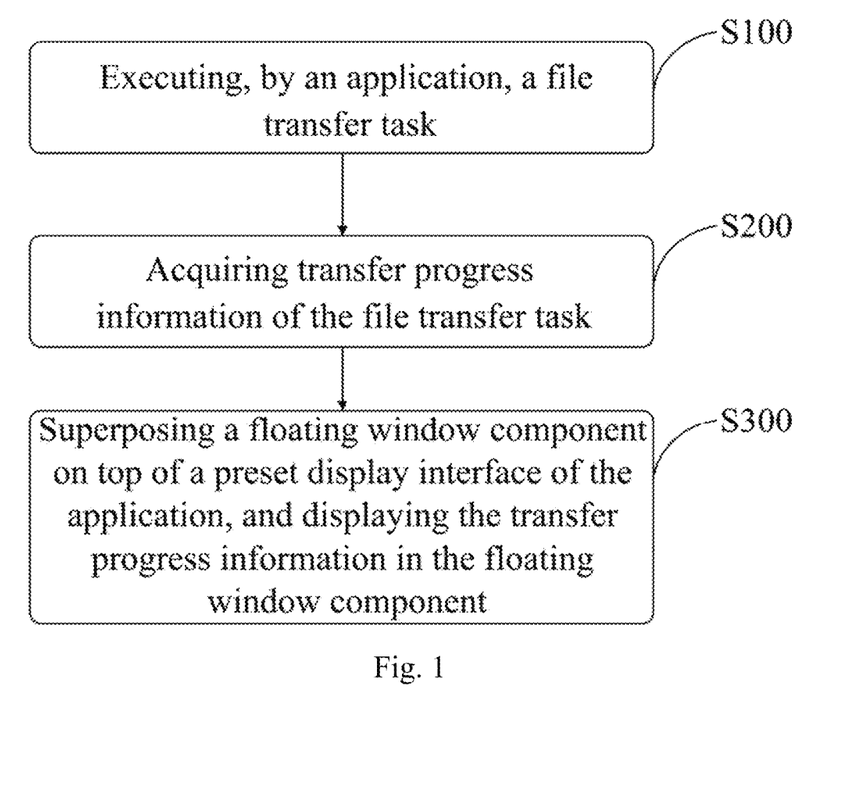
FIG. 1 is a flow schematic diagram of one embodiment of a file transfer display control method according to the present disclosure.

In one embodiment, the present disclosure provides a file transfer display control method, as shown in FIG. 1, including the following.

S100: an application executes a file transfer task.

An executive body of the present embodiment is a terminal. The application installed on the terminal executes the file transfer tasks. The file transfer tasks include file upload and download tasks. The application may simultaneously execute the one/a plurality of file transfer tasks. When executing the plurality of file transfer tasks, the application may execute the file transfer tasks according to an order of the start moments of the file transfer tasks, or the application performs parallel execution on the two to three file transfer tasks, so as to improve the transfer efficiency of the file transfer tasks.

S200: transfer progress information of the file transfer task is acquired.

When executing the file transfer tasks, the application records the transfer progress information of each file transfer task, and the transfer progress information of the file transfer task can be acquired through a data interface of the application.

S300: floating window component is superposed on top of preset display interfaces of the application, and the transfer progress information is displayed in the floating window component.

The floating window component is superposed on top of the preset display interface in the application. Specifically, there is a plurality of display interfaces with different functions in the application. One/a plurality of display interface(s) with different functions is/are set in advance as the preset display interface(s), then the floating window component is superposed on top of each preset display interface, and the acquired transfer progress information of the file transfer tasks is output and displayed in the floating window component.

In the present embodiment, the file transfer refers to transferring a file or a portion of the file from one terminal device to another terminal device, and may transfer the file to another terminal device for storage, or access a file on remote terminal device, or transfer the file onto another terminal device for operation or processing. Since file systems of various terminal devices in a network are different, a File Transfer Protocol (FTP) is used as an optional file transfer protocol in the present embodiment. In addition, a Hyper Text Transfer Protocol (HTTP)/Hypertext Transfer Protocol Secure (HTTPS) protocol may also be used as the file transfer protocol of the present embodiment.

In the present embodiment, the application is a content aggregation application, the body of which is a content aggregation platform. Different contents generated by different users are aggregated on the content aggregation platform, and include User Generates Content (UGC), Occupationally-generated Content (OGC) and Professional Generated Content (PGC). Meanwhile, contents in different forms are aggregated on the content aggregation platform, such as contents in a written form, a graphic form and a video form. In the present embodiment, a user of the application may upload local video works onto the content aggregation platform of the application to share the works with others. At this time, the terminal running this application is connected with a server of the content aggregation platform, and the application executes the file transfer task to upload a local video file to the server of the content aggregation platform, so that other users may browse the video works uploaded by the user on the content aggregation platform.

Figure 2:
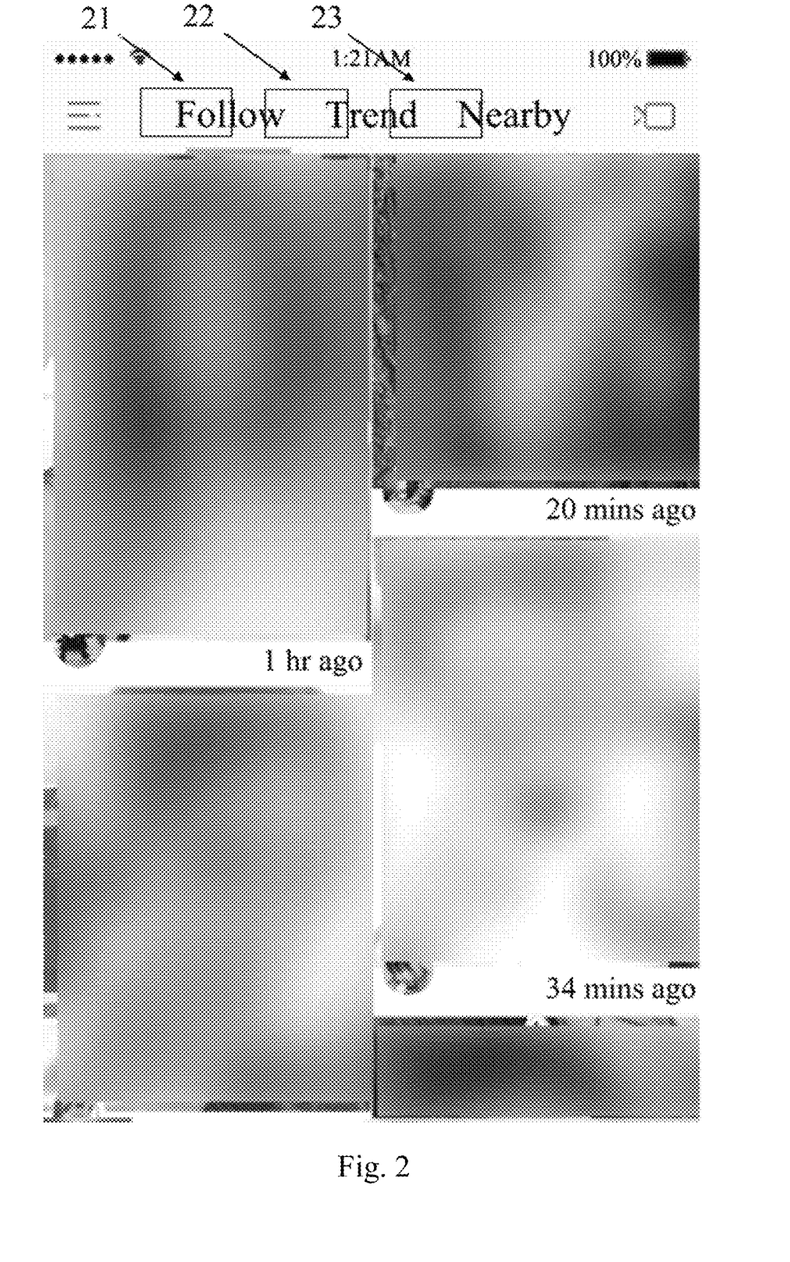
FIG. 2 is an example diagram of display interfaces of an application according to an embodiment of the present disclosure.

One application scene of the present embodiment is as shown in FIG. 2. There are three main content channels in the application. In this figure, 21 refers to a "Follow" channel, 22 refers to a "Trend" channel, and 23 refers to a "Nearby" channel. Each content channel corresponds to one display interface including certain contents. Content information posed by persons that the user follows is displayed in the "Follow" channel. Display modes of the display interfaces of the various channels are different due to the different channels. The display interfaces corresponding to the three content channels are set as the preset display interfaces of the application. When the application executes the file transfer tasks, and the user browses page contents on a preset display interface, the floating window component is superposed on top of preset display page. The floating window component exists independently of the preset display page. After the floating window component is superposed on top of the preset display interface, the user still may perform the same operations on the preset display interface as if the floating window component is not set, such as a sliding operation and a click operation. Meanwhile, the floating window component also exists when the user switches this preset display interface to other preset display interface. For example, when the user switches the "Follow" page to the "Trend" page, since the "Trend" page is also the preset display interface, a floating window is still superposed on top of the "Trend" page, and does not affect the normal operations of the user on the "Trend" page. It can be understood that setting the pages corresponding to the three content channels as the preset display interfaces in the present embodiment should not be regarded as a limitation to the number of the preset display pages. Those skilled in the art can set more pages in the application as the preset display interfaces according to an implementation mode of the present embodiment, so that the floating window component is superposed on top of more pages each in the application to display the transfer progress information of the file transfer task. After the floating window component is superposed on top of each preset display interface, when the user enters the preset display interface, the floating window component appears successively, and then the foregoing acquired transfer progress information of the file transfer task is displayed in the floating window component.

The present embodiment realizes displaying of the transfer progress information of the file transfer tasks executed by the application on top so that the user can conveniently check the file transfer progress in real time through the preset display interfaces, and meanwhile, the floating window component is superposed on top of and independent of the preset display interface, so as to not affect the user to operate on the current browsed preset display interface, reduce frequent switching of application pages, reduce the consumption of terminal resources, save user's time and improve the user experience.

In the embodiment of the present disclosure, the transfer progress information of the file transfer task includes file information and progress bar information. The file information is configured to represent feature information of the transferred file, including at least one of a file ID, a file name and a file format. The file name and the file format are user-visible file information. The file ID is the file information used by the application to distinguish each file transfer task. The progress bar information is configured to represent a completion progress of the file transfer task. Meanwhile, for each file transfer task, the file information corresponds to the progress bar information in a one-to-one manner. Each file transfer task is distinguished through the file ID to avoid the phenomenon of chaos in correspondence between the plurality of file transfer tasks and the plurality of pieces of transfer progress information and ensure that one file transfer task corresponds to its transfer progress information. In addition, if the progress bar information of each file transfer task has the completion progress of 100 percent, it is indicated that this file transfer task is completed, and the progress bar information dynamically changes with the completion degree of the file transfer task, so that the user may visually browse the completion of the file transfer task in the following floating window component.

Further, in one embodiment of the present disclosure, the step S300 includes that:

S310: feature information of the current preset display interface of the application is acquired;

S311: position information of the floating window component is acquired according to the feature information; and S312: the floating window component is superposed on top of the preset display interfaces of the application according to the position information.

The application internally includes a plurality of display interfaces with different functions. The display interfaces with the different functions are configured to display different information. The different display interfaces have different layout modes, different display positions of page information and different display colors of the page information due to the different functions. These different features are used as the feature information of each display interface. Certain display interfaces are set in the application as the preset display interfaces, and each preset display interface has its own feature information. Based on the above, the feature information may include one or more pieces of the following information: information corresponding to different functions, displayed on the display interfaces; the different layout modes of the display interfaces; the position information of the page information of the display interfaces; and color information of the page information.

In order not to affect browsing the information of the current preset display interface during the arrangement of the floating window component on the different preset display interfaces, when the application executes the file transfer task in a preset display interface, the position information of the floating window component in the current preset display interface is determined by acquiring the feature information of the current preset display interface. For example, when the feature information of the current preset display interface is "1", the position information of the floating window component is at "bottom of the interface", or when the feature information of the current preset display interface is "2", the position information of the floating window components is at "right of the interface", and then the floating window component is superposed on top of the current preset display interface according to the position information of the floating window component, so as to display the transfer progress information of the file transfer task executed by the application without affecting the user to browse the information of the current preset display interface.

Further, in another embodiment of the present disclosure, the step S300 includes that:

S320: feature information of the current preset display interface of the application is acquired;

S321: a display form of the floating window is acquired according to the feature information; and S322: the floating window component is superposed on top of the preset display interface of the application according to the display form.

Since the different preset display interfaces have different layout modes, different display positions of page information and different display colors of the page information, the display form of the floating window needs to be considered during the superposition of the floating window component on the different preset display interfaces. The display form of implementing the floating window includes the size, shape, foreground color, background color and transparency of the floating window and a layout mode, a color style and the like of the transfer progress information to be displayed in the floating window component. In order not to affect browsing the information of the current preset display interface during the arrangement of the floating window component on the different preset display interfaces, when the application executes the file transfer task in a preset display interface, the display form of the floating window component in the current preset display interface is determined by acquiring the feature information of the current preset display interface. For example, when the feature information of the current preset display interface is "1", the display form of the floating window component is "a longitudinal bar in a yellow background", or when the feature information of the current preset display interface is "2", the display form of the floating window component is "a fan shape in a transparent background", and then the floating window component is superposed on top of the current preset display interface according to the display form of the floating window component, so as to display the transfer progress information of the file transfer task executed by the application without affecting the user to browse the information of the current preset display interface.

In one optional embodiment of the present disclosure, the position information and the display form information of the floating window component are simultaneously acquired according to the feature information of the current preset display interface, and then the floating window component is superposed on top of the current preset display interface according to the position information and the display form of the floating window component. According to the present embodiment, different feature information of the different preset display interfaces is considered. The position information and/or the display form of the floating window component adaptively change/changes with the change of the preset display interface when the different preset display interface is switched to, so that the floating window component is better superposed on top of each of the different preset display interface to avoid the problem that a fixed display position and display form of the floating window component on different preset display interfaces affect the user to browse the information of the preset display interfaces.

In one optional embodiment of the present disclosure, the floating window component is arranged as attached to an edge position of the preset display interface of the application. Attaching the floating window component at the edge position of the preset display interface may better avoid the influence of the floating window component on the browsing performance of the preset display interface.

In one optional embodiment of the present disclosure, in order not to affect the user to browse the preset display page by the floating window component superposed on top of the preset display page, a transparency of 20 to 30 percent of the floating window component is set. Specifically, the transparency of the floating window component is changed by changing a transparency attribute value of the floating window component. For example, a transparency attribute value range of the floating window component is [0,1] where 0 denotes being completely transparent, and 1 denotes being completely not transparent. When a transparency of 20 percent of the floating window components is required, the transparency attribute value of the floating window components is set at 0.2.

In one embodiment of the present disclosure, the step S100 includes that:

S110: a current operation type of the user on the application is acquired;

S120: a network bandwidth proportion for executing the file transfer task is allocated according to the operation type; and S130: the application executes the file transfer task according to the network bandwidth proportion.

When the application executes the file transfer task, and the user performs other operations on the application, the current operation type of the user on the application is acquired. The operation type includes browsing a video, browsing an article, browsing a dynamic graph and the like. For example, the user browses video resources on other page of the application when the application executes the file transfer task. At this time, considering that the operation of the user on the application needs to occupy certain network bandwidth resources, the network bandwidth proportion for executing the file transfer task is allocated according to the operation type, and then the application executes the file transfer task according to the network bandwidth proportion. For example, if the network bandwidth resource is 100 M, the user browses the video when the application executes the file download transfer task. At this time, the network bandwidth proportion for executing the file download transfer task and browsing the video is allocated as 3:7, where more network bandwidth resource is allocated to the user to enable the user to watch the video more fluently and meet the requirement of the user. In addition, if the user browses the article when the application executes the file download transfer task, the network bandwidth proportion for executing the file download transfer task and browsing the article is allocated as 6:4 at this time. Since browsing the article occupies less network bandwidth resource, more network bandwidth resource is allocated to the file transfer task, so as to complete the file transfer faster.

In one embodiment of the present disclosure, after the step S300, the method further includes:

S400: a moving instruction acting on the floating window component is received to move the floating window component to a corresponding target position.

Since the floating window component is superposed on tops of the preset display interface and independent of the preset display interface, when the user finds that the superposed floating window component affects the browsing performance of the current display interface, the moving instruction acting on the floating window component may be used. For example, the user drags the floating window component by a finger, and then releases it as the finger moves to the target position to trigger the moving instruction. At this time, the application moves the floating window component to the corresponding target position in response to the moving instruction, so as to ensure that the floating window component does not affect the user to browse the content on the preset display interface.

In the present embodiment, the method further includes:

S410: a resizing instruction acting on the floating window component is received to shrink or expand the floating window component.

Since the floating window component is superposed on top of the preset display interface and independent of the preset display interface, when the user finds that the size of the superposed floating window component affects the browsing performance of the current display interface, the resizing instruction acting on the floating window component may be used. For example, the user presses edges of the floating window component by the fingers, and then releases them as the fingers move to the target positions to trigger the resizing instruction. At this time, the application shrinks or expands the area of the floating window component in response to the resizing instruction, so as to ensure that the floating window component do not affect the user to browse the content on the preset display interface.

In another embodiment of the present disclosure, the transfer progress information of the file transfer task displayed in the floating window component also responds to preset instructions acting on the file transfer task. The preset instructions include a pause instruction, a cancel instruction and a retransfer instruction. For example, the transfer progress information of each file transfer task in the floating window component has buttons such as "Pause", "Cancel" and "Retransfer", configured to receive the preset instructions acting on the file transfer tasks in the floating window component. The corresponding preset instructions are triggered after the user operates these buttons.

When the user presses the "Pause" button, for example, the triggered preset instruction is the pause instruction, and at this time, the transferring of the corresponding file transfer task is paused.

When the user presses the "Cancel" button, for example, the triggered preset instruction is the cancel instruction, and at this time, the transferring of the corresponding file transfer task is canceled.

When the user presses the "Retransfer" button, for example, the triggered preset instruction is the retransfer instruction, and at this time, the transferring of the corresponding file transfer task is re-executed.

In one optional embodiment of the present disclosure, the transfer progress information corresponding to the preset number of file transfer tasks is displayed in the floating window components.

Specifically, when the application executes the plurality of file transfer tasks, only the transfer progress information corresponding to a preset number of file transfer tasks is displayed in the floating window component. It can be seen from the above that the floating window component is component independent of the preset display interface of the application and superposed on the preset display interface.

Figure 3:
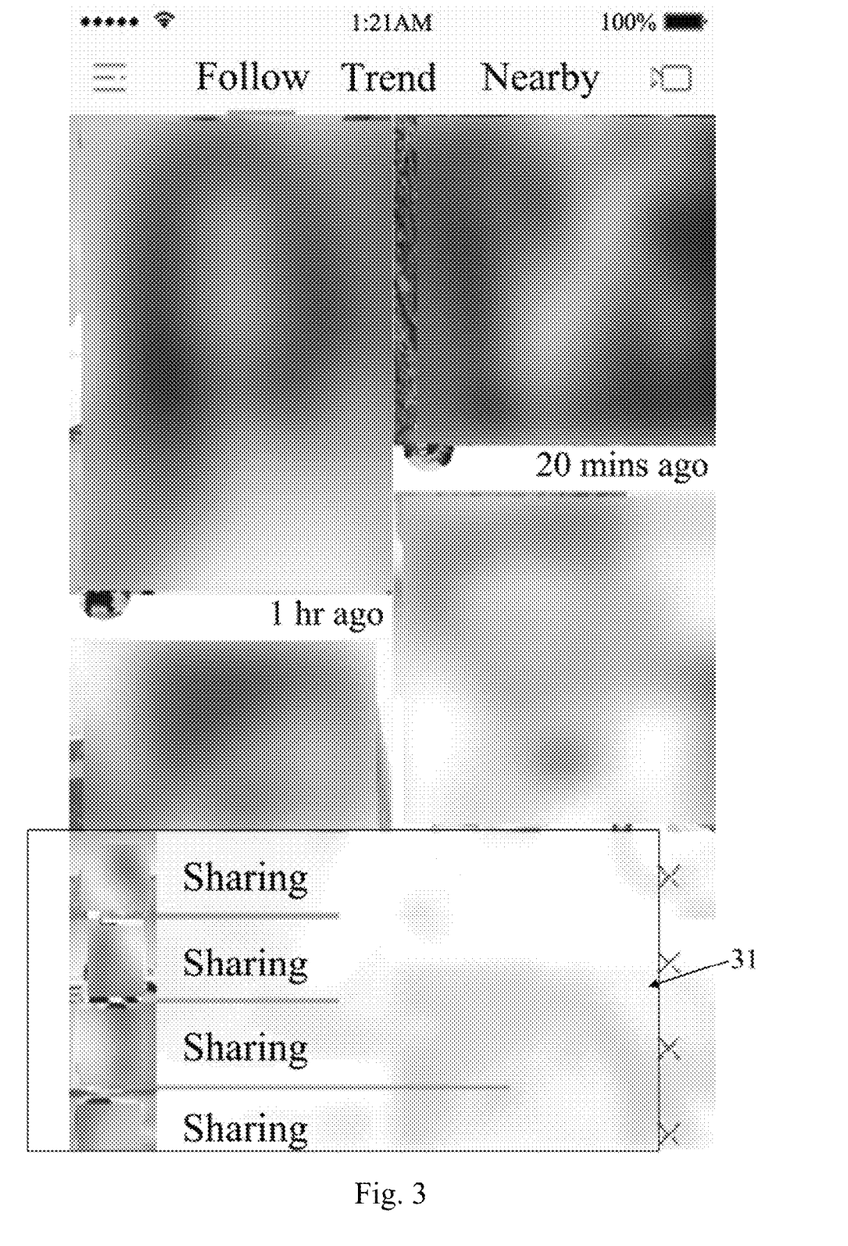
FIG. 3 is a schematic diagram of the display interfaces and floating window components of the application according to the embodiment of the present disclosure.

In order to avoid the superposed floating window component from affecting the user to browse and operate on the preset display interface, a certain height and width are set for the floating window. The limited size limits the number of pieces of the transfer progress information of the file transfer tasks displayed on the floating window component. Therefore, in the default state of the floating window component, the floating window component only displays the transfer progress information corresponding to the preset number of file transfer tasks. For example, as shown in FIG. 3, the floating window component 31 is superposed at the bottom of the preset display interface, and displays the transfer progress information of the three and a half file transfer tasks in the default state.

Further, in one embodiment of the present disclosure, after the step S300, the method further includes:

S500: a first display instruction acting on the floating window component is received to display the transfer progress information of all the file transfer tasks in the floating window component.

If the user needs to check the transfer progress information of all the file transfer tasks, the user may operate the floating window component to enable it to display the transfer progress information of all the file transfer tasks. For example, the first display instruction acting on the floating window component is to drag up the edge of the floating window component to change the size of the floating window component, and display the transfer progress information of all the file transfer tasks.

In another embodiment of the present disclosure, after the step S300, the method further includes that:

S502: a second display instruction acting on the floating window component is received to jump to the display interface of the file transfer tasks of the application. The display interface of the file transfer tasks is configured to display the transfer progress information of all the file transfer tasks.

When the application executes the file transfer tasks, the application has one display interface configured to display all the file transfer tasks. In the present embodiment, the floating window component superposed on the preset display interface is used to display the transfer progress information of the preset number of file transfer tasks. Meanwhile, the floating window component is also used as an entrance to jump to the display interfaces for the file transfer tasks. When the user needs to check all the file transfer tasks, the application jumps to the corresponding display interface for the file transfer tasks of the application through the second display instruction acting on the floating window component, and may check all the file transfer tasks through this display interface. Moreover, transfer progress information data in the floating window component are internal data of the application, the floating window component exists depending on the application, and the data are not transmitted through other third-party applications, thereby guaranteeing the security of the data of the application.

Further, in one embodiment of the present disclosure, when the application executes the file transfer task, a determination program is set for each file transfer task to determine whether the file transfer task is completed. When the complete progress of the transfer progress information of the file transfer task is 100 percent, it is indicated that the file transfer task is completed, and at this time, corresponding transfer success prompt information is output. The prompt information includes text prompt information and/or voice prompt information. The user may know that the transferring of the corresponding file transfer task is completed after receiving this prompt information.

When the file transfer task fail, reasons include a network problem, a file loss problem, a problem that a file format is not supported and a file size problem, and at this time, corresponding transfer failure prompt information is output. Similarly, the prompt information includes text prompt information and/or voice prompt information. Optionally, the form of the transfer failure prompt information and the form of the transfer success prompt information are different, to facilitate the user to distinguish whether the file transfer tasks succeed. The user may know that the corresponding file transfer task fails after receiving the transfer failure prompt information, so as to select subsequent operations.

In the present embodiment, the application automatically re-executes the file transfer task when determining that one file transfer task fails for the first time. That is, after the file transfer task fails, and before the transfer failure prompt information is output, the method further includes that:

S600: the failed file transfer task is re-executed.

The application re-executes the file transfer task after determining for the first time that the certain file transfer task fails. Further, after the file transfer task is executed for the second time, if it is determined that the re-executed file transfer task fails for the second time, transfer failure prompt information is output at this time, and the prompt information includes prompting the user to manually give the retransfer instruction on the file transfer task.

Figure 4:
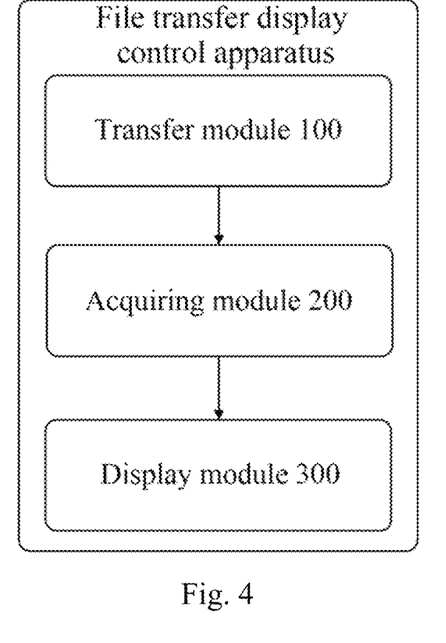
FIG. 4 is a schematic diagram of one embodiment of a file transfer display control apparatus according to the present disclosure.

In another embodiment, the present disclosure provides file transfer display control apparatus, as shown in FIG. 4, including:

a transfer module 100, configured to execute a file transfer task;

an acquiring module 200, configured to acquire transfer progress information of the file transfer task; and a display module 300, configured to superpose a floating window component on top of preset display interface of the application, and display the transfer progress information in the floating window component.

The transfer module 100 executes the file transfer task. That is, files are transferred to other terminals or servers through the transfer module 100. In the present embodiment, the file transfer tasks include file upload and file download tasks. The file upload task is that the transfer module 100 transfers a local file to another terminal device, and the file download task is that the transfer module 100 acquires a file from remote terminal device. The transfer module 100 may simultaneously execute the one/a plurality of file transfer task(s). When executing a plurality of file transfer tasks, the transfer module 100 executes the file transfer tasks according to an order of the start moments of the file transfer tasks. Optionally, the transfer module 100 may perform parallel execution on the two to three file transfer tasks, so as to improve the transfer efficiency of the file transfer tasks.

The acquiring module 200 acquires the transfer progress information of the file transfer task. The transfer progress information of the file transfer task includes file information and progress bar information. The file information is configured to represent feature information of the transferred file, including at least one of a file ID, a file name and a file format. Meanwhile, for each file transfer task, the file information corresponds to the progress bar information in a one-to-one manner. Each file transfer task is distinguished through the file ID to avoid the phenomenon of chaos in correspondence between the plurality of file transfer tasks and the plurality of pieces of transfer progress information and ensure that one file transfer task corresponds to its transfer progress information.

The display module 300 superposes the floating window component on top of the preset display interface in the application. The floating window component exists independently of the preset display page. After the floating window component is superposed on top of the preset display interface, the user still may perform the same operations on the preset display interface as if the floating window component is not set. After the floating window component is superposed on top of each preset display interface, when the user enters the preset display interface, the floating window component appears successively, and then the foregoing acquired transfer progress information of the file transfer task is displayed in the floating window component.

Figure 5:
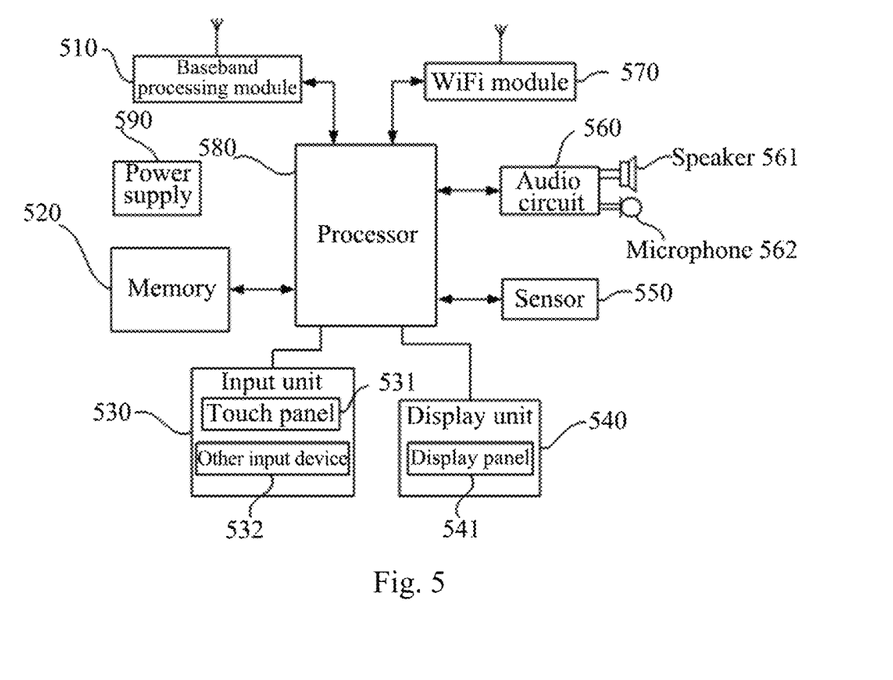
FIG. 5 is a schematic diagram of one embodiment of partial structures of a terminal according to an embodiment of the present disclosure.

In a further embodiment, the present disclosure further provides a terminal, configured to realize the file transfer display control method as illustrated by FIGS. 1-3. As shown in FIG. 5, a block diagram of partial structures of the terminal provided by the embodiment of the present disclosure is illustrated. For ease of explanation, portions related to the embodiment of the present disclosure are illustrated only, and for certain technical details not shown, please refer to the method section of the embodiment of the present disclosure. The terminal may be any terminal device including a mobile phone, a tablet computer, a Personal Digital Assistant (PDA), a Point of Sales (POS), a vehicle-mounted computer, etc. The terminal being the mobile phone is taken as an example.

Referring to FIG. 5, the mobile phone includes a baseband processing module 510, a memory 520, an input unit 530, a display unit 540, a sensor 550, an audio circuit 560, a wireless fidelity (WiFi) module 570, a processor 580, and a power supply 590, etc. Those skilled in the art can understand that the structure of the mobile phone shown in FIG. 5 does not constitute a limitation to the mobile phone, and may include more or fewer components than those shown in the figure, or combine some components, or arrange different components.

The baseband processing module 510 may be configured to synthesize a baseband signal to be transmitted, or decode a received baseband signal. Specifically, during transmission, an audio signal is compiled into a baseband code for transmission. During receiving, the received baseband code is interpreted into the audio signal. Meanwhile, the baseband processing module 510 is also configured to compile address information (a mobile phone number and a website address), text information (a short message text and a website text), and picture information (a multimedia message).

The memory 520 may be configured to store software and modules. The processor 580 runs the software and modules stored in the memory 520 to execute various functional applications and data processing of the mobile phone. The memory 520 may mainly include a program storage region and a data storage region. The program storage region may store an operating system, at least one function required application program (such as a sound playback function and an image playback function), and the like. The storage data region may store data (such as audio data and a phone book) created according to the use of mobile phone. In addition, the memory 520 may include a high-speed random access memory, and may further include a non-volatile memory, such as at least one magnetic disk storage device, a flash memory device, or other volatile solid-state storage devices.

The input unit 530 may be configured to receive input numeric or character information, and generate key signal inputs related to user settings and function control of the mobile phone. Specifically, the input unit 530 may include a touch panel 531 and other input equipment 532. The touch panel 531, also referred to as a touch screen, may collect user's touch operations on or near it (for example, the user uses a finger, a stylus or any suitable object or accessory to perform operations on or near the touch panel 531), and drive corresponding connection apparatus according to a preset program. Optionally, the touch panel 531 may include two parts: touch detection apparatus and a touch controller. The touch detection apparatus detects a touch orientation of the user, detects a signal brought by the touch operation, and transmits the signal to the touch controller. The touch controller receives touch information from the touch detection apparatus, converts it into touch coordinates, and sends the touch coordinates to the processor 580, and may receive and execute commands sent by the processor 580. In addition, the touch panel 531 may be implemented by using various types such as a resistive type, a capacitive type, an infrared ray, and a surface acoustic wave. In addition to the touch panel 531, the input unit 530 may further include the other input equipment 532. Specifically, the other input equipment 532 may include, but is not limited to, one or more of a physical keyboard, function keys (such as volume control keys and a switch key), a trackball, a mouse, an operation lever, and the like.

The display unit 540 may be configured to display information input by the user or information provided for the user and various menus of the mobile phone. The display unit 540 may include a display panel 541, which may be, optionally, configured in the forms of a Liquid Crystal Display (LCD), an Organic Light-Emitting Diode (OLED), and the like. Further, the touch panel 531 may cover the display panel 541. When the touch panel 531 detects the touch operation on or near it, the touch panel 531 transmits the touch operation to the processor 580 to determine the type of a touch event. Then, the processor 580 provides a corresponding vision output on the display panel 541 according to the type of the touch event. Although, in FIG. 5, the touch panel 531 and the display panel 541 serve as two separate components to realize the input and output functions of the mobile phone, in some embodiments, the touch panel 531 and the display panel 541 may be integrated to realize the input and output functions of the mobile phone.

The mobile phone may further include at least one sensor 550, such as a light sensor, a motion sensor, and other sensors. Specifically, the light sensor may include an ambient light sensor and a proximity sensor. The ambient light sensor may adjust the brightness of the display panel 541 according to the brightness of ambient light. The proximity sensor may shut down the display panel 541 and/or the backlight when the mobile phone is moved to an ear. As one type of the motion sensors, an accelerometer sensor may detect accelerations in various directions (usually triaxial), and may detect the magnitude and direction of the gravity when it is stationary. This sensor may be configured for applications requiring identifying mobile phone attitudes (such as horizontal and vertical screen switching, related games, and magnetometer attitude calibration), vibration recognition related functions (such as a pedometer, and tap), and the like. The mobile phone may also be equipped with a gyroscope, a barometer, a hygrometer, a thermometer, an infrared sensor and other sensors, and descriptions thereof are omitted here.

The audio circuit 560, a speaker 561 and a microphone 562 may provide an audio interface between the user and the mobile phone. The audio circuit 560 may convert received audio data into electrical signals and transmit the signals to the speaker 561, and the electrical signals are converted into a sound signal by the speaker 561 to be output. On the other hand, the microphone 562 converts the collected sound signal into an electrical signal, the audio circuit 560 converts the electrical signal into the audio data after receiving the electrical signal, and then the audio data are output to the processor 580 for processing and sent to, such as, another mobile phone through an RF circuit, or the audio data are output to the memory 520 for further processing.

WiFi is a short-range wireless transmission technology. The mobile phone may help the user send and receive emails, browse web pages, access streaming media and the like through the WiFi module 570, and provides the user with wireless broadband Internet accesses. Although FIG. 5 shows the WiFi module 570, it can be understood that this module does not belong to necessary configuration of the mobile phone, and may be omitted as needed without changing the essence of the present disclosure.

The processor 580 is a control center of the mobile phone, and uses various interfaces and lines to connect the various parts of the entire mobile phone. The processor 580 runs or executes the software and/or modules stored in the memory 520, and calls the data stored in the memory 520 to execute various functions of the mobile phone and process the data, so as to monitor the entire mobile phone. Optionally, the processor 580 may include one or more processing units. Optionally, the processor 580 may integrate an application processor and a modem processor. The application processor mainly processes the operating system, a user interface, the application program and the like, and the modem processor mainly deals with wireless communication. It can be understood that the foregoing modem processor may not be integrated into the processor 580, either.

The mobile phone further includes the power supply 590 (such as a battery) for supplying power to the various components. Optionally, the power supply may be logically connected to the processor 580 through a power management system, thereby realizing functions of managing charging, discharging and power management and the like through the power management system.

Although not shown, the mobile phone may further include a camera, a Bluetooth module, and the like, and descriptions thereof are omitted here.

In the embodiment of the present disclosure, the processor 580 included in the terminal further has the following functions of:

executing a file transfer task;

acquiring transfer progress information of the file transfer task; and superposing a floating window component on top of preset display interface of an application, and displaying the transfer progress information in the floating window component.

In addition, all functional units in all the embodiments of the present disclosure can be integrated into one processing module, or each unit can physically exist alone, or two or more units can be integrated in one module. The above integrated modules can be implemented in the form of hardware, or can be implemented in the form of software functional modules. The integrated modules, if implemented in the form of the software functional modules and sold or used as a standalone product, may be stored in a computer readable storage medium.

The above-mentioned storage medium may be a read-only memory, a magnetic disk or an optical disk, or the like.

When the application executes the file transfer task, the present disclosure realizes displaying of the transfer progress information of the file transfer task executed by the application on top by acquiring the transfer progress information of the file transfer task, superposing the floating window component on top of the preset display interface of the application and displaying the transfer progress information in the floating window component so that the user can conveniently check the file transfer progress in real time through the preset display interface, and meanwhile, the floating window component is superposed on top of the preset display interface in an independent existence manner, so as to not affect the user to operate the current browsed preset display interface, reduce frequent switching of application pages, reduce the consumption of terminal resources, save user's time and improve the user experience.

In addition, in the present disclosure, according to different feature information of the preset display interfaces, position information and/or the display form of the floating window component adaptively change/changes with the change of the preset display interfaces when a different preset display interface is switched to, so that flexible arrangement of the position information and the display form of the floating window component in different preset display interfaces avoids that a fixed floating window component affects the user to browse the current preset display interface due to the feature information of the different preset display interfaces.

Furthermore, the user can directly give pause, cancel and retransfer instructions for the file transfer tasks in the floating window component, so as to facilitate the operations for the file transfer tasks. Moreover, the number of times of switching the application pages by the user is reduced, the consumption of the terminal resources is reduced, the user's time is saved, and the user experience is further enhanced.

The above describes only partial embodiments of the present disclosure. It should be noted that those of ordinary skilled in the art can further make several improvements and retouches without departing from the principles of the present disclosure. These improvements and retouches shall also all fall within the protection scope of the present disclosure.

The invention claimed is:

1. A file transfer display control method, comprising:
executing, by an application, a file transfer task;
acquiring transfer progress information of the file transfer task; and
superposing a floating window component on top of a preset display interface of the application, and displaying the transfer progress information in the floating window component, wherein superposing the floating window component on top of the preset display interface of the application comprises:
acquiring feature information of a current preset display interface of the application;
acquiring position information of the floating window component according to the feature information; and
superposing the floating window component on top of the preset display interface of the application according to the position information.

2. The method according to claim 1, wherein superposing the floating window component on top of the preset display interface of the application further comprises:
acquiring a display form of a floating window according to the feature information; and
superposing the floating window component on top of the preset display interface of the application according to the display form.

3. The method according to claim 1, wherein the floating window component is arranged as attached to an edge position of the preset display interface of the application.

4. The method according to claim 1, wherein a transparency of the floating window component is set at 20 to 30 percent.

5. The method according to claim 1, wherein after superposing the floating window component on top of the preset display interface of the application, the method further comprises:
receiving a moving instruction acting on the floating window component to move the floating window component to a corresponding target position.

6. The method according to claim 1, wherein executing, by the application, the file transfer task comprises:
acquiring a current operation type for the application;
allocating a network bandwidth proportion for executing the file transfer task according to the operation type; and
executing the file transfer task according to the network bandwidth proportion.

7. The method according to claim 1, wherein after superposing the floating window component on top of the preset display interface of the application, and displaying the transfer progress information in the floating window component, the method further comprises:
receiving a preset instruction acting on the corresponding file transfer task in the floating window component, wherein the preset instruction comprise a pause instruction, a cancel instruction and a retransfer instruction; wherein
when the preset instruction is the pause instruction, pausing transferring of a corresponding file transfer task;
when the preset instruction is the cancel instruction, canceling the transferring of the corresponding file transfer task; and
when the preset instruction is the retransfer instruction, re-executing the transferring of the corresponding file transfer task.

8. The method according to claim 1, wherein the transfer progress information comprises file information and progress bar information; and the file information comprises at least one of a file ID, a file name and a file format, and for each file transfer task, file information corresponds to progress bar information in a one-to-one manner.

9. The method according to claim 1, wherein displaying the transfer progress information in the floating window component comprises:
displaying transfer progress information corresponding to a preset number of file transfer tasks in the floating window component.

10. The method according to claim 9, wherein after superposing the floating window component on top of the preset display interface of the application, and displaying the transfer progress information in the floating window component, the method further comprises:
receiving a first display instruction acting on the floating window component to display the transfer progress information of all the file transfer tasks in the floating window component.

11. The method according to claim 9, wherein after superposing the floating window component on top of the preset display interface of the application, and displaying the transfer progress information in the floating window component, the method further comprises:
  receiving a second display instruction acting on the floating window component to jump to a display interface for the file transfer tasks of the application, wherein the display interface for the file transfer tasks is configured to display the transfer progress information of all the file transfer tasks.

12. The method according to claim 1, wherein after superposing the floating window component on top of the preset display interface of the application, and displaying the transfer progress information in the floating window component, the method further comprises:
  determining whether the file transfer task is completed;
  outputting transfer success prompt information when the file transfer task is completed; and
  outputting transfer failure prompt information when the file transfer task fails.

13. The method according to claim 12, wherein before outputting transfer failure prompt information when the file transfer task fails, the method further comprises:
  re-executing a failed file transfer task.

14. A terminal, comprising:
  one or more processors;
  a memory; and
  one or more application programs, wherein the one or more application programs are stored in the memory and configured to be executed by the one or more processors, wherein the one or more application programs are configured to: execute a file transfer display control method comprising:
  executing, by an application, a file transfer task;
  acquiring transfer progress information of the file transfer task; and
  superposing a floating window component on top of a preset display interface of the application, and displaying the transfer progress information in the floating window component, wherein superposing the floating window component on top of the preset display interface of the application comprises:
  acquiring feature information of a current preset display interface of the application;
  acquiring position information of the floating window component according to the feature information; and
  superposing the floating window component on top of the preset display interface of the application according to the position information.

15. A non-transitory computer readable storage medium, storing a computer program, wherein
  the computer program is executed by a processor to implement a file transfer display control method comprising:
  executing, by an application, a file transfer task;
  acquiring transfer progress information of the file transfer task; and
  superposing a floating window component on top of a preset display interface of the application, and displaying the transfer progress information in the floating window component, wherein superposing the floating window component on top of the preset display interface of the application comprises:
  acquiring feature information of a current preset display interface of the application;
  acquiring position information of the floating window component according to the feature information; and
  superposing the floating window component on top of the preset display interface of the application according to the position information.

* * * * *